United States Patent
Nandram et al.

(10) Patent No.: US 6,880,837 B2
(45) Date of Patent: Apr. 19, 2005

(54) DOLLY FOR MOVING ARTICLES INCLUDING LATERAL FILING CABINETS

(76) Inventors: Kamal Roy Nandram, 203 Balmoral Place, Ottawa (CA), K1H 1B2; Jean-Guy Dube, 147 Isabelle Street, Hull, Quebec (CA), J8Y 5H6

( * ) Notice: Subject to any disclaimer, the term of this patent is extended or adjusted under 35 U.S.C. 154(b) by 137 days.

(21) Appl. No.: 10/114,935

(22) Filed: Apr. 4, 2002

(65) Prior Publication Data

US 2003/0086776 A1 May 8, 2003

(30) Foreign Application Priority Data

Nov. 8, 2001 (CA) .............................................. 2362086

(51) Int. Cl.$^7$ ................................................ B62B 3/10
(52) U.S. Cl. ................................... 280/79.11; 414/444
(58) Field of Search ............................... 414/444, 458; 280/47.23, 79.11; 254/3 R, 3 C

(56) References Cited

U.S. PATENT DOCUMENTS

| | | | | |
|---|---|---|---|---|
| 1,364,234 A | * | 1/1921 | Beagle | 254/2 C |
| 2,505,583 A | * | 4/1950 | Sage et al. | 280/62 |
| 3,024,036 A | * | 3/1962 | Reynolds | |
| 3,529,736 A | * | 9/1970 | Lebre | 414/458 |
| 3,857,579 A | * | 12/1974 | Hoodenpyle | |
| 4,127,202 A | * | 11/1978 | Jennings et al. | 414/537 |
| 4,921,264 A | * | 5/1990 | Duffy | |
| 5,180,178 A | * | 1/1993 | Caceres | 280/47.34 |
| 5,358,264 A | * | 10/1994 | Hewitt | |
| 5,441,378 A | * | 8/1995 | Puls | 414/458 |
| 5,486,014 A | * | 1/1996 | Hough | |
| 6,155,662 A | * | 12/2000 | Fookes et al. | 312/351.1 |
| 6,386,560 B1 | * | 5/2002 | Calender | 280/47.34 |

* cited by examiner

Primary Examiner—James W. Keenan
(74) Attorney, Agent, or Firm—David J. French

(57) ABSTRACT

A dolly for moving articles including lateral filing cabinets, comprising a support surface for one end portion of such a cabinet, and upstanding members partially surrounding the support surface for locating the cabinet in position. The upstanding members include an upstanding end member for locating one end of a cabinet and side members for locating sides of the cabinet, the dolly having an open end opposite the end member which allows the dolly to be slid underneath the cabinet when tilted. Side wheels are mounted on fixed axles outside of the support surface adjacent the open end, and a caster wheel is mounted by a bracket extending outside of, and supported by, the end member. The dolly can be used by one operator to move a fully loaded lateral filing cabinet without tilting the cabinet to such an extent to cause damage.

7 Claims, 4 Drawing Sheets

DOLLY FOR MOVING ARTICLES INCLUDING LATERAL FILING CABINETS

BACKGROUND OF THE INVENTION

1. Field of the Invention

The present invention relates to a dolly designed for moving articles including lateral office filing cabinets, i.e. those filing cabinets having a width larger than their depth and in which the drawers open on one of the longer sides of the cabinet. The dolly can however be used for moving many other articles of furniture.

2. Prior Art

In moving office furniture, the moving of filing cabinets, especially lateral filing cabinets, represents particular problems since these are very heavy if filled or even partially filled with files, and they tend to be structurally weak so as to need proper support when being lifted or moved. If a full lateral filing cabinet is tilted more than a small amount damage can occur.

Usually, filing cabinets are wholly or largely emptied of files, and are then lifted onto standard dollies of the type commonly used by movers, and which have four caster wheels mounted under a horizontal platform, which platform needs to be about 5 to 6 inches high to accommodate the wheels. The lifting is difficult, usually needing two persons, and for this reason when the cabinets are moved temporarily, for re-flooring, for example, a large number of the dollies are required which are left underneath the cabinets while in a storage location.

U.S. Pat. No. 3,024,036, which issued Mar. 6, 1962 to Reynolds, shows a dolly for use in moving vertical filing cabinets, i.e. cabinets of the type which have drawers opening from the shorter side of the cabinet. This patent has a detailed review of the drawbacks of conventional equipment for moving filing cabinets. The patent proposes a rectangular dolly with two front caster wheels and two side wheels which may have fixed axles. The support surface of the dolly is sloping so that the front of the cabinet is tilted back during transportation. Although the support surface is below the tops of the side wheels, it is above the top of the front caster wheels and is also above the axles of all the wheels; the dimensions are such that the cabinet has to be tilted at an angle of about 20° to the vertical in order for the dolly to be located underneath it. The dolly has no means for positively locating the front of the cabinet, leading to the possibility that the load may be too far forward or too far back on the dolly. Although Reynolds suggests that, for unloading the cabinet, the operator may kick the dolly from under the cabinet, there is no provision for easily moving the dolly with a foot.

SUMMARY OF THE INVENTION

In accordance with the present invention, a dolly for moving articles, including lateral filing cabinets, comprises:

a support surface for one end of a lateral filing cabinet and for major side portions of the cabinet adjoining said one end;

upstanding members partially surrounding said support surface for locating the cabinet in position on said support surface, said upstanding members including an upstanding end member for positively locating the one end of the cabinet on the support surface and upstanding side members for locating sides of the cabinet, said support surface and side members defining an open end of the dolly opposite said end member such as allows the dolly to be slid underneath a tilted cabinet until said end member engages the end of the cabinet and said support surface is located under a major end portion of the cabinet;

a pair of side wheels each mounted on fixed axles outside of the support surface adjacent said open end of the dolly, and a caster wheel mounted by means of a bracket extending outside the end member.

Normally, the bracket is supported by the end member. Preferably, the support surface is below the axes of the side wheels, and it may be below the axes of all the wheels. This means it is much lower than in Reynolds, and may be less than 2 inches, and preferably less than 1 ½ inch, above a floor on which the wheels rest.

The caster wheel is preferably a single wheel mounted on a vertical axis which is centrally situated relative to the side members. Also, the bracket holding the caster wheel preferably has an upstanding lip displaced from the upstanding end member for manipulation by an operator's foot.

BRIEF DESCRIPTION OF THE DRAWINGS

Preferred embodiments of the invention will now be described by way of example with reference to the accompanying drawings, in which.

DETAILED DESCRIPTION

Figure 1:
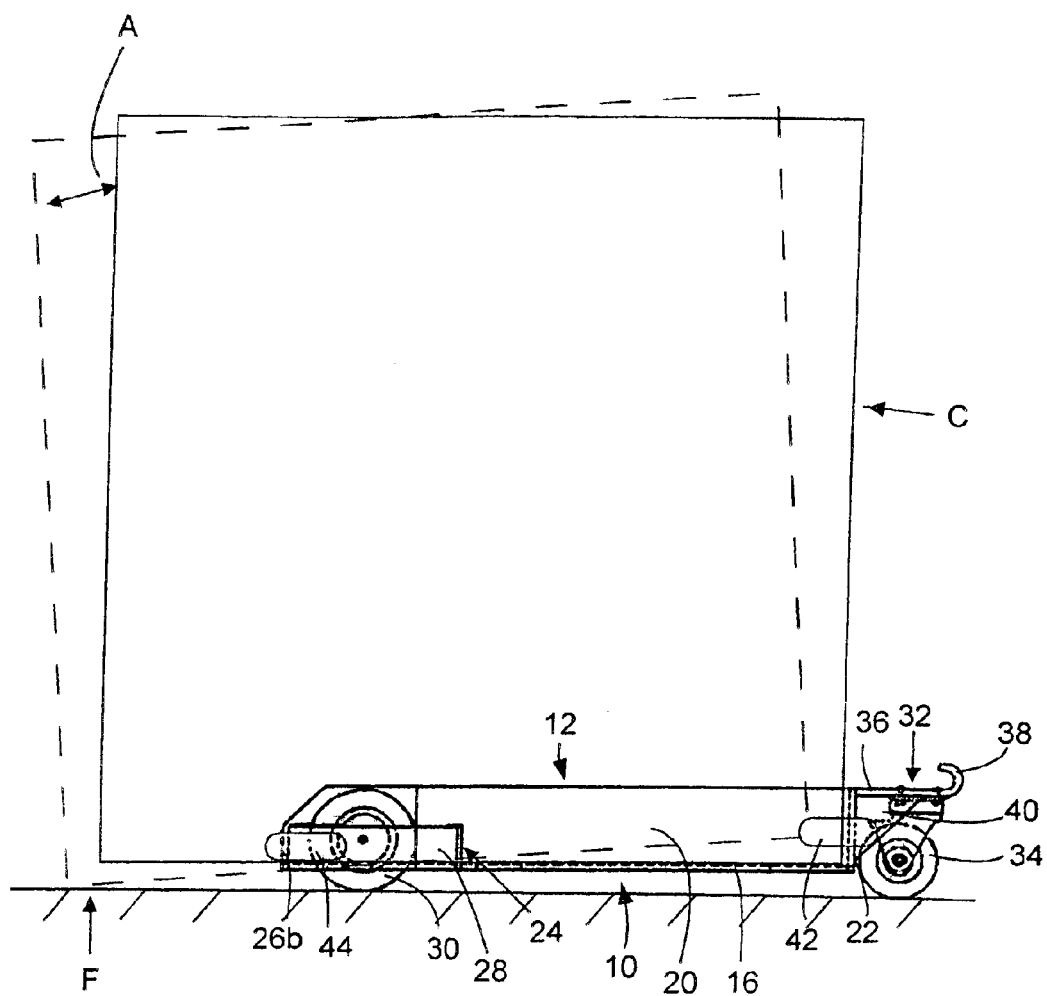
FIG. 1 is a side view of a first embodiment of dolly, showing also a lateral filing cabinet supported by the dolly.
Figure 2:
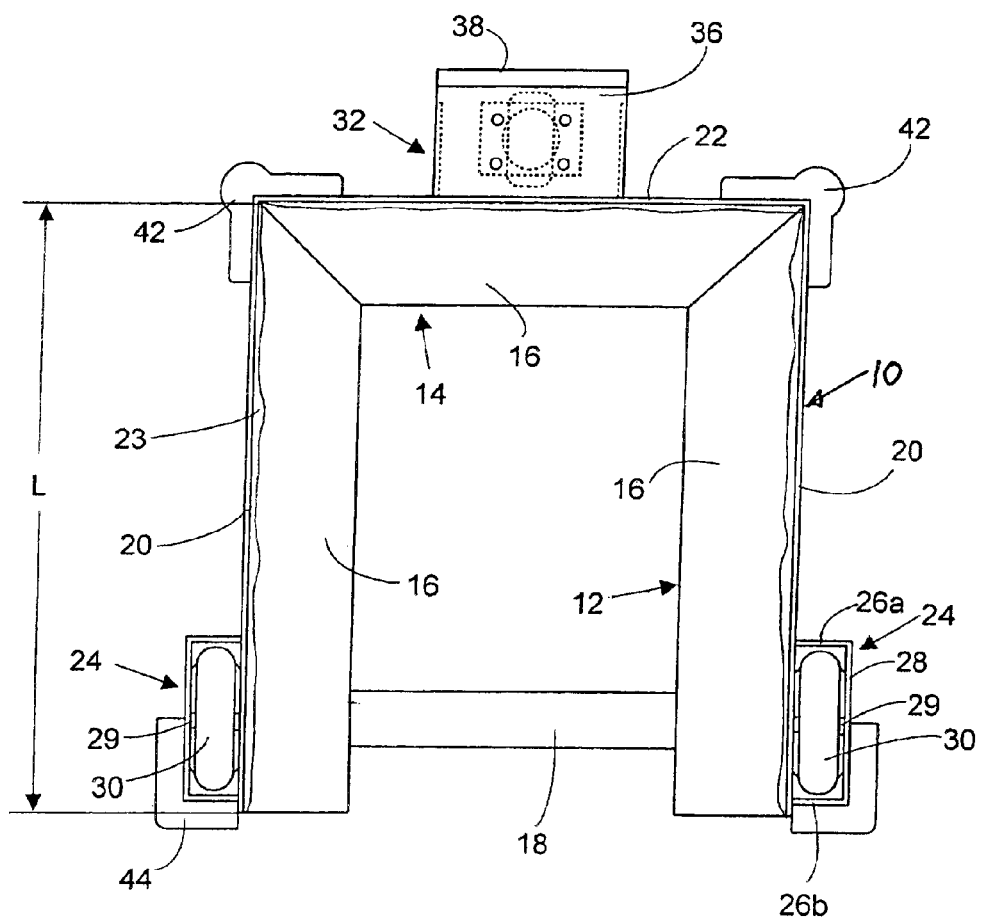
FIG. 2 is a plan view of the same dolly.

Referring to FIGS. 1 and 2, the frame 10 of the dolly comprises two parallel angle members 12 which provide the sides for the dolly and which have corresponding ends joined by a similar end angle member 14. These angle members have co-planar horizontal flanges 16, each with a width of between 3 and 4 inches, which provide a support surface for a major end portion of a lateral filing cabinet. For such cabinets which are commonly 36 inches wide, the length "L" of the support surface, as indicated in FIG. 2, needs to be well over 18 inches, and is preferably about 24 to 25 inches. Outer end portions of the flanges 16 are joined by a cross member 18 having an upper support surface co-planar with that of the flanges 16. The vertical flanges of the members 12 and 14 have a height which is similarly about 3 to 4 inches, and these flanges provide upstanding side members 20 rigidly and integrally connected to the support surface and an upstanding end member 22. The flanges 16, 20 and 22 define an open, unobstructed end of the dolly so that this can be slid under a cabinet as described below. The members 20, 22 have padding 23 on their internal surfaces to prevent scratching of cabinets.

Near to the open end of the dolly a wheel support bracket 24 is welded to the outer side of each side member 20. Each bracket is a box-type structure having two outwardly projecting front and rear members 26a and 26b respectively welded to the side member 20, and an outer side member 28 supported by and welded to the members 26a and 26b. At each side of the dolly the members 20 and 28 between them support a fixed axle 29 of wheel 30, which has a diameter slightly larger than the depth of the side member 20 and which projects below the bottom of the member 20 by about ¾ to 1 inch. Wheels axles 29 are preferably about 1 to 4 inches to the rear of the center of a lateral filing cabinet when located as indicated.

A bracket 32 fixed to the center of the upstanding end member 22 holds a caster wheel 34 of slightly smaller diameter than wheels 30, and which also projects below the bottom of angle member 14 by about ¾ to 1 inch, so that the support surface provided by the horizontal flanges 16 is normally horizontal, or at least parallel to a floor F. The bracket 32 includes a horizontal plate 36 projecting from the upper margin of the member 22 and having an outer upturned lip 38, and which is braced by side gussets 40. The single caster wheel 34 is pivotal about a vertical axis which is centrally situated relative to the side members 12. The lip 38 is inwardly curved so as to be usable as a carrying handle for the dolly.

The front outer corners of the dolly, i.e. at the meeting points of the members 12 and 14, are provided with resilient bumpers 42, and further bumpers 44 are provided at the rear corners of the side wheel brackets 24.

The manner in which a lateral filing cabinet C can be loaded onto the dolly is illustrated in FIG. 1. The cabinet, which can remain fully loaded, is tilted through an angle "A" to allow the support surface constituted by the flanges 16 to be slid underneath the cabinet until the end of the cabinet meets the upstanding end member 22, when the cabinet is then tilted back to the upright position. In this position the axles of wheels 30 are just to the rear of the center of gravity of the cabinet, making it easy to turn and manoeuvre the cabinet. The use of a single, central caster wheel also allows easy turning and precise manoeuvring in tight spaces, there being no need to align two casters as in the Reynolds dolly. For unloading, the cabinet is again tilted to bring the outer end against the floor, and the dolly is removed by the operator using his foot on the lip 38 to pull the dolly from under the cabinet. These operations can be carried out by a single operator, unlike with the problem of loading the cabinets onto conventional dollies, and there is no need to provide many dollies to be left in place under the cabinets.

In practice, the support surface provided by flanges 16 may be only about 1 inch above floor level, which means that the cabinet needs only to be tilted by an angle "A" of no more than about 5°, and preferably not more than 10°, as compared to about 20° for the prior art Reynolds dolly. Such tilting can be achieved with a fully loaded cabinet without harm.

The dolly can be used for other items of furniture, for example bookshelves or other furniture items which will fit on the support surface. In this case, where the item is too narrow to rest properly on flanges 16, a portion of the underside of a bookshelf, for example, is supported by the cross member 18.

Figure 3:
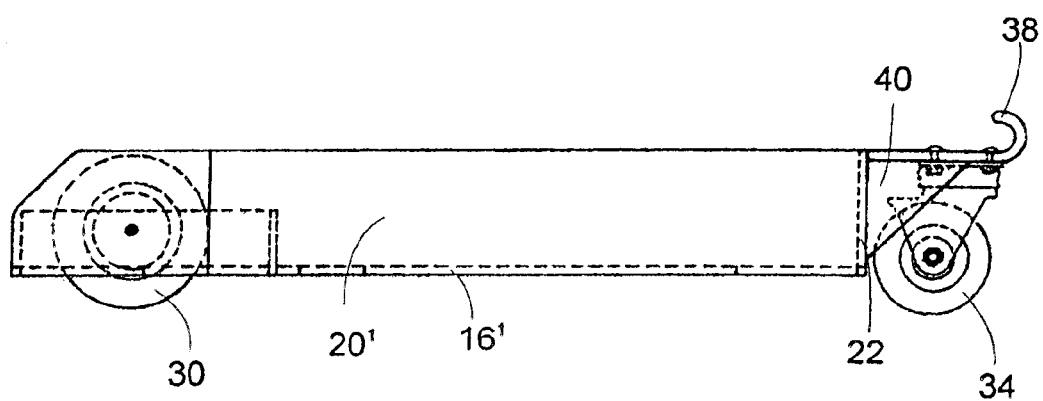
FIG. 3 is a view similar to FIG. 1 of a second embodiment of dolly.
Figure 4:
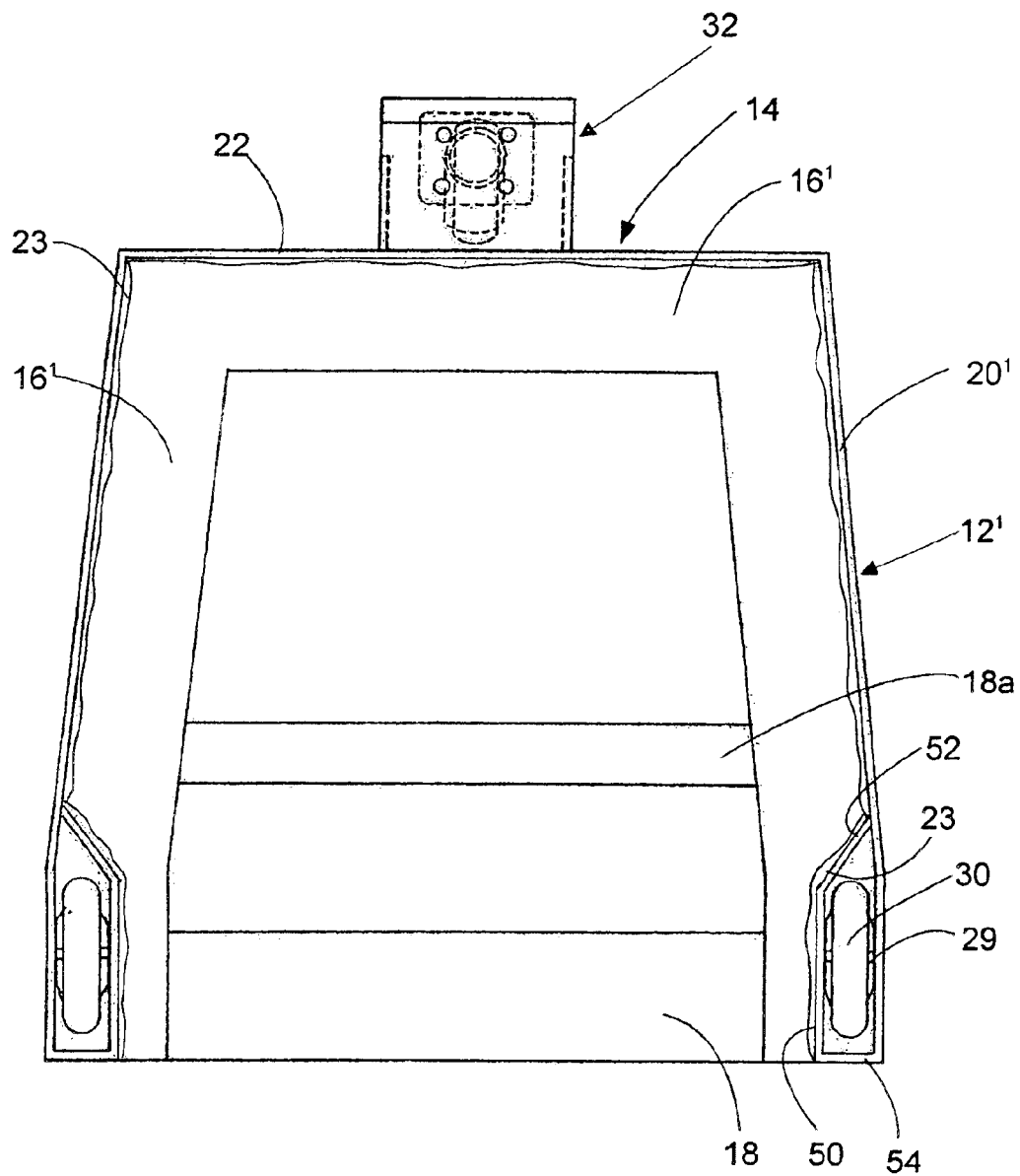
FIG. 4 is a plan view of the dolly of FIG. 3.

FIGS. 3 and 4 show a modified form of the dolly. Those parts which are essentially the same as those of the first embodiment are shown the same reference numerals.

The main difference in this embodiment is that the flanges of side angle members 12' provide upstanding side members 20' which diverge from the connection with the upstanding end member 22 sufficiently that the side wheels 30 and their supports are accommodated within the rear end portions of these side members. Specifically, the outer end portions of the members 20' provide outer side members which support the outer ends of the wheel axles 29, while the inner ends of these axles are held by vertical plates 50 spaced inside the members 20' and connected thereto by front transverse plate members 52 and rear transverse plate members 54. These plates 50 provide inner side members portions for locating the sides of a cabinet, and the inner surfaces of the plates 50 are provided with the same kind of padding 23 used in the first embodiment. This diverging form of the angle members 12' is advantageous in guiding the dolly through doorways or similar apertures, whereas in the first embodiment there may be a tendency for the projecting wheel brackets 24 to become snagged in such apertures.

Also, this dolly has a central cross member 18a which is additional to the rear cross member 18 in order to increase the structural strength.

The frames of both dollies are preferably formed of aluminum, since weight is always a consideration with equipment of this kind which needs to be carried into buildings.

We claim:

1. A dolly for moving an article of furniture, comprising:
   a support surface for one end of an article of furniture and for major side portions of the said article adjoining said one end;
   upstanding members partially surrounding said support surface for locating the article in position on said support surface, said upstanding members including an upstanding end member for positively locating said one end of the article on the support surface and upstanding side members having portions thereof for locating sides of the article, said support surface and side members being rigidly connected together and defining an open end opposite said end member, so that said open end allows the dolly to be slid underneath the article when the article is tilted until said end member engages said one end of the article, whereby said support surface is located under a major end portion of the article;
   a pair of side wheels each mounted on a fixed axle which is generally perpendicular to said side members and is located outside of said portions of said side members which can locate a side of said article and adjacent said open end of the dolly;
   said side members each including an inner side member portion for locating the sides of said article and an outer side member, said outer side members diverging towards the open end of the dolly and serving to guide the dolly through narrow spaces, said side wheels being mounted between said inner side member portions and said outer side members, and
   a caster wheel mounted by means of a bracket extending outside the said end member; and
   wherein said axles of the side wheels are higher than said support surface.

2. A dolly according to claim 1, wherein all said wheels have axes higher than said support surface.

3. A dolly according to claim 1, wherein, when said wheels are resting on a horizontal floor, said support surface is no higher than 2 inches above said floor.

4. A dolly according to claim 1, wherein, when said wheels are resting on a horizontal floor, said support surface is no higher than 1½ inches above said floor.

5. A dolly according to claim 1, wherein said bracket is supported by said end member.

6. A dolly according to claim 1, wherein said caster wheel is a single wheel pivotal about a vertical axis which axis is centrally situated relative to said side members, and wherein said bracket has an upstanding lip displaced from the said end member for manipulation by an operator's foot.

7. A dolly according to claim 1, wherein portions of said side members and of said support surface are integrally formed by vertical and horizontal flanges of angled members.

* * * * *